United States Patent [19]

Kawaharazaki et al.

[11] 4,213,580
[45] Jul. 22, 1980

[54] SEATBELT RETRACTOR

[75] Inventors: Takashi Kawaharazaki, Toyoake; Fuminori Teraoka, Toyota; Tatsushi Kubota, Okazaki; Kenji Matsui, Higashikamo, all of Japan

[73] Assignee: Kabushiki Kaisha Tokai Rika Denki Seisakusho, Aichi, Japan

[21] Appl. No.: 952,828

[22] Filed: Oct. 20, 1978

[30] Foreign Application Priority Data

Oct. 24, 1977 [JP] Japan .................. 52-143105[U]

[51] Int. Cl.² ................ A62B 35/00; B65H 75/48
[52] U.S. Cl. .................... 242/107; 242/107.4 R
[58] Field of Search .................... 242/107–107.7; 297/388; 280/801–808

[56] References Cited

U.S. PATENT DOCUMENTS 4,125,231   11/1978   Henderson ................ 242/107
4,126,282   11/1978   Morita et al. .............. 242/107

Primary Examiner—John M. Jillions
Attorney, Agent, or Firm—Koda and Androlia

[57] ABSTRACT

A first and a second spring are connected in series to a take-up shaft of a seatbelt so as to generate wind-up force; when the seatbelt is put on by an occupant, a pawl is engaged with a latch gear provided at a connecting portion between said springs, whereby the biasing force of only one of said springs is imparted to the take-up shaft, thereby decreasing the wind-up force of the take-up shaft; after the seatbelt is released from the occupant, the pawl is disengaged from the latch gear by a camplate means, whereby the wind-up forces of both springs are imparted to the take-up shaft, thereby increasing the wind-up force of the take-up shaft; and further, frictional means for engaging the latch gear with the pawl is brought into frictional contact with the take-up shaft by means of a pair of projecting resilient means oscillatingly movable, thereby securing the engagement between the latch gear and the pawl.

9 Claims, 10 Drawing Figures

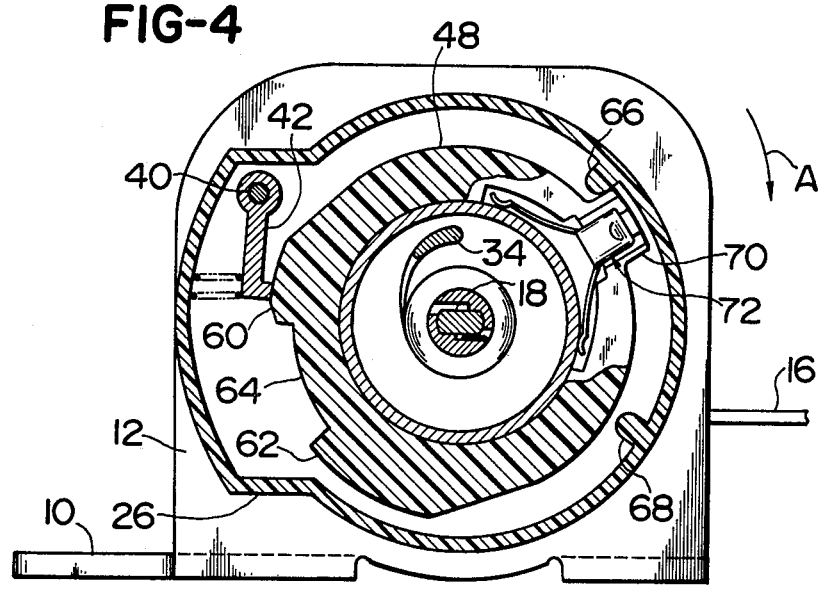
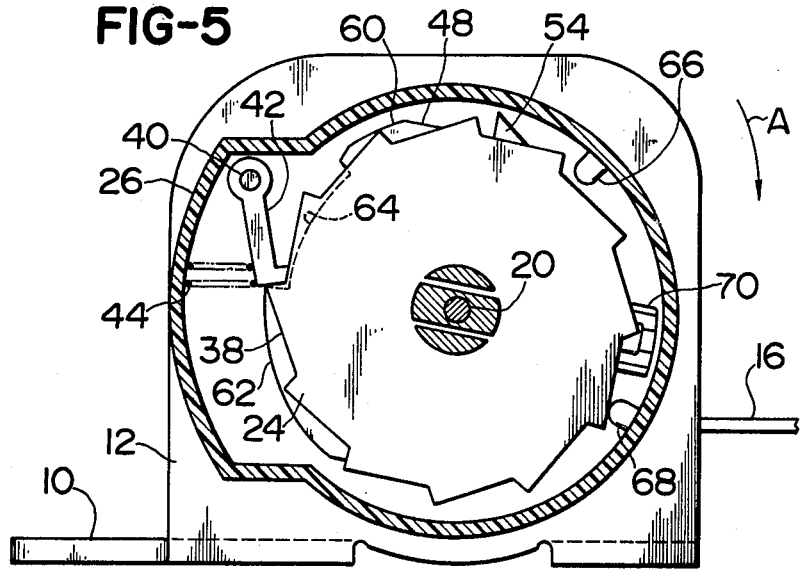

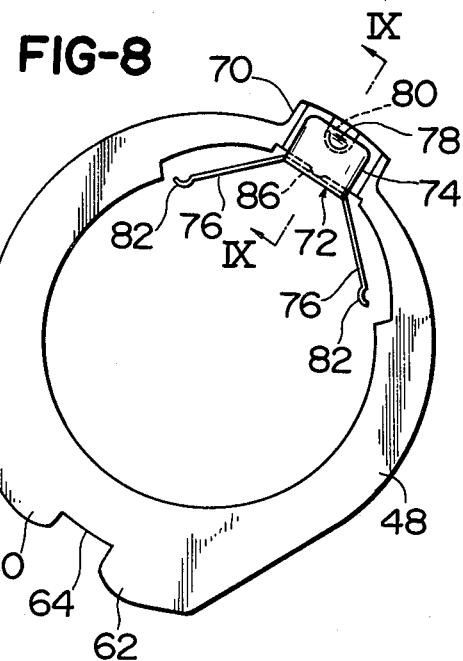
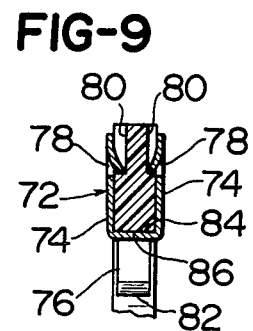
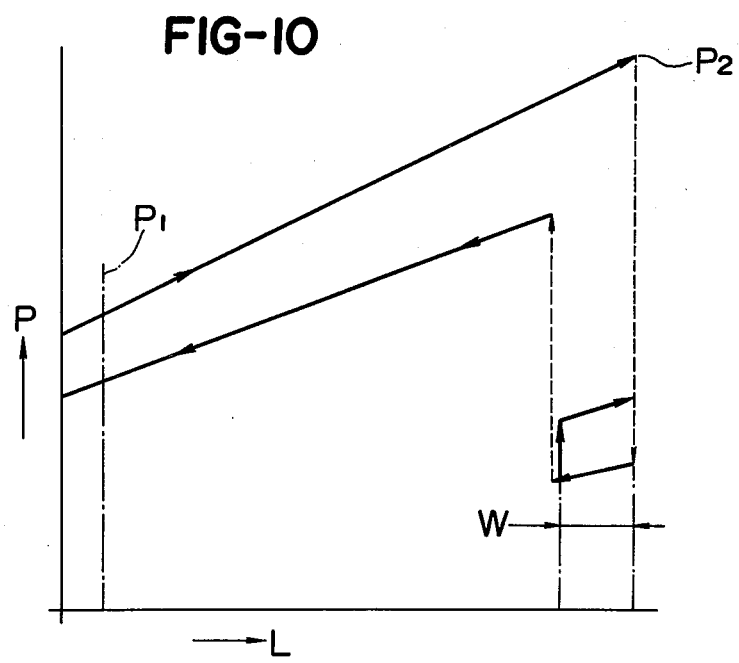

ns of SEATBELT RETRACTOR

BACKBROUND OF THE INVENTION

1. Field of the Invention

The present invention relates to seatbelt retractors for automatically winding up the seatbelt for protecting an occupant in an emergency of a vehicle such as a collision accident, and more particularly to seatbelt retractors in which consideration is given to the control of wind-up force when necessary.

2. Description of the Prior Art

Heretofore, it has been common in practice to use an automatic seatbelt retractor wherein a single spiral spring is used, the internal end of which is engaged with a take-up shaft and the external end of which to the main body of the seatbelt retractor to thereby impart the wind-up force to the take-up shaft.

However, with the conventional seatbelt retractor as described above, the biasing force of the spiral spring is increased with the wind-out of the seatbelt, and hence, there has been such a drawback that the force for winding up the seatbelt is increased with the wind-out of the seatbelt, the restraining force acting on the occupant is strong when the occupant wears the seatbelt on, thereby worsening the fitness of the seatbelt.

Particularly, with the seatbelt retractor wherein a continuous seatbelt consisting of a lap seatbelt and a shoulder seatbelt is used with a wind-up device being provided on the shoulder seatbelt side, the seatbelt wind-up value by the seatbelt retractor is further increased, thus considerably intensifying the feeling of being restrained for the occupant. Consequently, in the case design is made such that the force of the spiral spring is suitable for the occupant when the occupant wears the seatbelt on, the wind-up force becomes insufficient at the time of wind-up when the seatbelt is released from the occupant, and it has been difficult to satisfactorily wind up the seatbelt after the release of the seatbelt.

SUMMARY OF THE INVENTION

In view of the facts described above, the object of the present invention is to provide a seatbelt retractor wherein: first and second springs are connected in series to the seatbelt take-up shaft to generate the wind-up force and; when the seatbelt is worn by an occupant, a pawl is engaged with a latch gear provided at a connecting portion between the first and second springs to prevent the wind-up force of the first spring from acting on the take-up shaft; the seatbelt is wound up by a low wind-up force only by use of the second spring to reduce the restraining force acting on the occupant, and, after the release of the seatbelt from the occupant, the pawl is disengaged from the latch gear by a camplate means whereby the wind-up forces of the first and second springs are imparted to the take-up shaft, thereby enabling to reliably house the seatbelt. Further, in order to secure the operations described above, frictional means for engaging the latch gear with the pawl is brought into frictional contact with the take-up shaft by means of a pair of projecting resilient members oscillatingly movable, thus securing the reliable operations.

Description will hereunder be given of one embodiment of the present invention with reference to the drawings.

BRIEF DESCRIPTION OF THE DRAWINGS

FIG. 4 is a sectional view taken along the line IV—IV in FIG. 1;

FIGS. 5 through 7 are sectional views in explanation of the operating conditions in the sectional view taken along the line V—V in FIG. 1;

FIG. 8 is a front view showing the camplate;

FIG. 9 is a sectional view taken along the line IX—IX in FIG. 8; and

FIG. 10 is the characteristic diagram of the operation of the present embodiment.

DESCRIPTION OF THE PREFERRED EMBODIMENT

Figure 1:
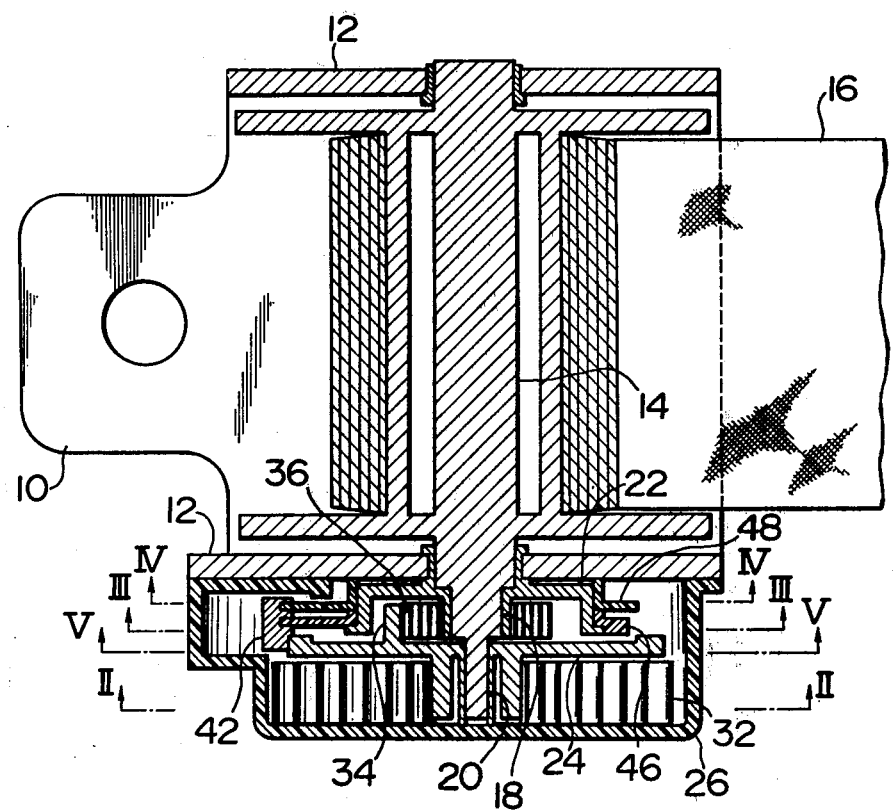
FIG. 1 is a sectional view showing one embodiment of the seatbelt retractor according to the present invention.

Referring to the drawings, a main body 10 of a retractor of the seatbelt retractor is made of a thin metal sheet, formed into substantially a letter 'U' shape and whose legs 12, 12 are pivoted thereon with a take-up shaft 14. Engaged with said take-up shaft 14 is one end of a seatbelt 16 so that said take-up shaft 14 can rotate in the wind-up direction (in the direction indicated by an arrow A in FIGS. 2 and 3) to thereby wind up the seatbelt in layers. Furthermore, said seatbelt 16 is arranged such that, after winding out a required length thereof from the retractor, it engages a tongue plate secured to the other end not shown with buckle means whereby the seatbelt 16 is brought into contact with the body of the occupant, being suspensively wound around the body, so that the occupant can be restrained.

Figure 3:
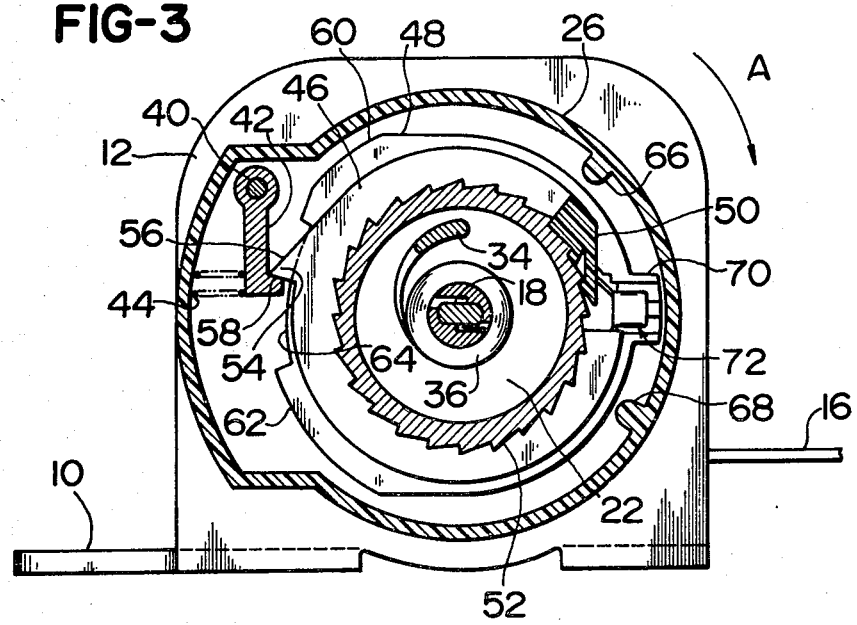
FIG. 3 is a sectional view taken along the line III—III in FIG. 1.

The take-up shaft 14 projecting from one of the legs 12 of the main body 10 is formed with a parallelly-faced narrowed-down portion 18 and the end portion of the shaft is ending into a small diameter portion 20 less in diameter than the portion of engaging the seatbelt. Coupled to said parallelly-faced narrowed-down portion 18 of the take-up shaft 14 is a rectangular shaft hole divided into two of a gear wheel 22 as shown in FIG. 3, and coupled into said small diameter portion 20 is a shaft portion 25 of a latch gear wheel 24 whereby the gear wheel 24 is pivotally supported so that the gear wheel 22 can rotate along with the take-up shaft 14 and the latch gear wheel 24 can freely rotate independently of the take-up shaft 14.

Figure 2:
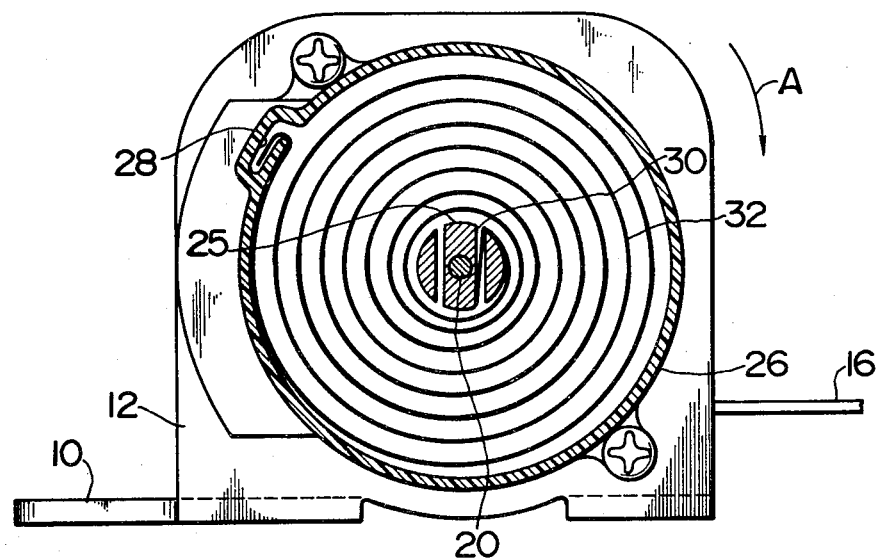
FIG. 2 is a sectional view taken along the line II—II in FIG. 1.

These gear wheel 22 and latch gear wheel 24 are housed in a spring box 26 installed on the side surface of one of the legs 12 of the main body 10. As shown in FIG. 2, engaged with a slit 28 provided on the inner peripheral surface of the spring box 26 and a slit 30 formed in a shaft portion 25 of the latch gear wheel 24, respectively, are the internal and external ends of the first spring 32 to thereby bias the latch gear wheel in the direction indicated by the arrow A. Additionally, a bracket 34 having a wing shaped cross-section and projecting in the direction opposite to the shaft portion 25 of the latch gear wheel is wound around by the external end of the second spring 36 and engaged therewith, and the internal end of the second spring 36 is inserted into and engaged with a space formed between the gear wheel 22 and the parallelly-faced narrowed-down portion 18 to thereby bias the gear wheel 22 in the direction indicated by the arrow A.

Consequently, these first and second springs 32, 36 are connected in series to each other through the gear wheel 22 and adapted to bias the take-up shaft 14 in the direction of winding up the seatbelt 16 in cooperation. Said second spring 36 is adapted to have a biasing force, i.e. generating torque is less than that of the first spring 32. Furthermore, for these springs, the spiral springs are used, however, of course, it is possible to use usual tension springs through a slight change in design.

Carvingly provided on the outer periphery of said latch gear wheel 24 are latch gears 38 which are ratchets facing in one direction only. These latch gears 38 and the pawl 42 oscillatingly movably pivoted through a pivot 40 on one of the legs 12 of the main body 10 constitute ratchet means. Said pawl 42 is biased toward the latch gears 38 by the biasing force of a compression coil spring 44 confined between the spring box and the pawl 42 itself, and, when engaged with the latch gear 38, is adapted to prevent the latch gear wheel 24 for rotating in the direction indicated by the arrow A. Consequently, when the ratchet means is engaged, the biasing force of said first spring 32 is imparted to neither the gear wheel 22 nor the take-up shaft 14, and only the second spring 36 is adapted to act as the wind-up force for the seatbelt 16.

Coupled to the outer periphery of the gear wheel 22 rotatable along with the take-up shaft 14 are a camplate 46 and a friction plate 48, both of which receive the turning force of the gear wheel 22 by the frictional force.

As shown in FIG. 3, projected integrally from part of said camplate 46 is an arm 50, which constitutes a one-way clutch together with a latch 52 carvingly provided on the outer periphery of the gear wheel 22. Said one-way clutch engages the arm 50 only when the gear wheel 22 rotates in the direction indicated by the arrow A to rotate the camplate 46. When the gear wheel 22 rotates in the direction opposite to the above, said one-way clutch imparts the turining force only by the frictional force to the camplate 46 via the arm 50.

Furthermore, a substantially triangular ridge 54 is formed at a portion of the outer periphery of said camplate 46, and said ridge 54 has an inclined surface 56 functioning as a cam surface and a vertical surface functioning as a stopper surface, both of which abut against the pawl 42 at the time of rotation.

With the arrangement as described above, said camplate 46, when the gear wheel 22 rotates in the direction indicated by the arrow A, rotates along therewith, with the result that the cam surface 56 urges up the pawl 42 against the biasing force of the compression coil spring 44, and, when the gear wheel 22 rotates in the direction opposite to the above, said camplate 46 is lightly rotated due to the frictional force with the gear wheel 22, with the result that the stopper surface 58 abuts against a hook-shaped portion of the pawl 42 as shown in FIG. 3, to thereby prevent further rotation.

Next, the friction plate 48 mounted on the gear wheel 22 similarly to the camplate 46 is provided on the outer periphery thereof with a wind-out operation holding portion 60 and a wind-up operation holding portion 62 across a bottom 64, both of which are projected radially. Additionally, the frictional plate 48 is provided thereon at a position opposite to said portions 60 and 62 with a protrusion 70 for regulating the angle of rotation of the frictional plate 48 between stoppers 66 and 68 which are arranged at a proper interval along the inner periphery of the spring box 26.

Furthermore, as shown in FIGS. 8 and 9, the protrusion 70 is installed with a resilient member 72. Said resilient member 72 consists of a letter 'U' shaped base portion 74 and two projecting portion 76 integrally formed on said base portion 74. The base portion 74 clamps the protrusion 70 in the direction of wall thickness thereof and semicircularly shaved-up pieces 78 which are portions of the base portion 74 is engaged with bottom portions of letter 'U' shaped grooves 80 formed in the protrusion 70 to thereby prevent the base portion 74 from falling. Said two projections 76 are spread outwardly in a manner that the respective longitudinal axes cross at an obtuse angle, and are arranged such that the outer periphery of the gear wheel 22 comes into contact with and between said two projections 76. The contact of the projections 76 with the outer peripheral surface of the gear wheel 22 is made by semicircular arcuate portions 82 provided at the forward end portions of the projections 76.

Additionally, the base portion 74 of said resilient member 72 has its letter 'U' shaped bottom 84 in contact with the forward end portion of a triangular ridge 86 inwardly projecting from the friction plate 48, and hence, the state of contact at this portion is a substantially linear contact and the resilient member 72 is adapted to be oscillatingly movable about said contact portion.

Consequently, in the case of receiving frictional resistance from the gear wheel 22, i.e. in the case the take-up shaft 14 rotates in either direction, the camplate 46 is adapted to receive the same frictional resistance.

Figure 7:
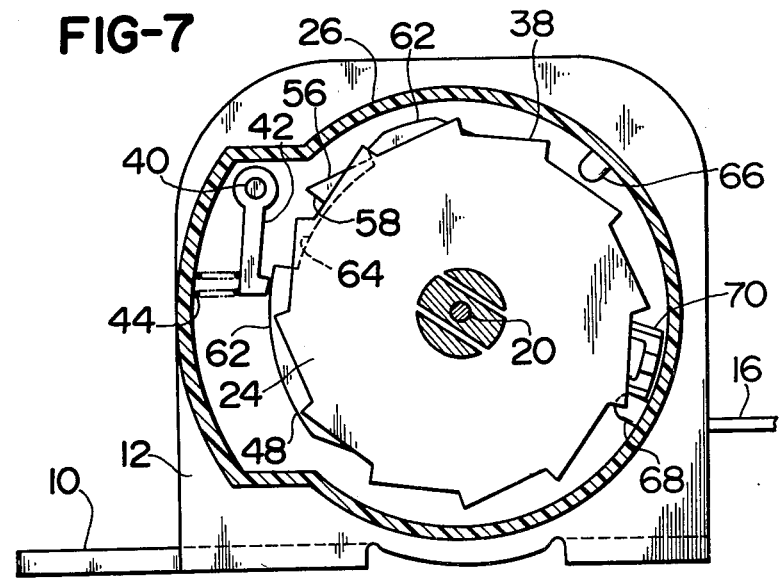

As described above, when the protrusion 70 to which the resilient member 72 is installed abuts against the stopper 66 in the spring box 26 as shown in FIG. 4, the wind-out operation holding portion 60 urges up the pawl 42 to thereby prevent said pawl 42 from coming into contact with the latch gear wheel 24. Additionally, when the protrusion 70 abuts against the stopper 68 as shown in FIG. 7, the wind-up operation holding portion 62 similarly urges up the pawl 42 to thereby prevent the latch gear wheel 24 from coming into contact with the pawl 42. Unevenness on the friction plate 48 is designed to have such a suitable contour that, when the pawl 42 is coupled into the bottom 64, the pawl 42 engages the latch gear 38 of the latch gear wheel 24 as shown in FIG. 5, thereby not imparting the biasing force of the first spring 32 to the take-up shaft. For this reason, the radially projecting lengths of the latch gear 38 of the latch gear wheel 24, of the ridge 54 of the camplate 46 and of the wind-out and wind-up operation holding portions 60, 62 of the friction plate 48 are designed such that that of the ridge 54 is largest and that of the latch gear 38 is least.

Description will hereunder be given of operation of the present embodiment arranged as above. In the condition where the seatbelt is wound out at the time when the occupant is about to put the seatbelt on, the take-up shaft 14 rotates in the direction opposite to that indicated by the arrow A in FIG. 3, the gear wheel 22 rotatable therewith will rotate the camplate 46 and the friction plate 48 in the same direction as above due to the frictional force. As the result, the camplate 46 rotates until the stopper surface 58 of the ridge 54 abuts against the pawl 42, and the friction plate 48 rotates until the wind-out operation holding portion 60 similarly abuts against the pawl 42 and stops thereat.

Here, the latch gear wheel 24 provided at the connecting portion between the two springs rotates along with the wind-out of the webbing in the direction opposite to that indicated by the arrow A, and hence, when the seatbelt is further drawn out, the latch gear 38 urges up the pawl 42 against the biasing force of the compression coil spring 44, with the result that the stopping of the wind-out operation holding portion 60 is released, thus rotating the friction plate 48 and further, the operation holding portion 60 turns the pawl 42 in the clockwise direction to a position the pawl 42 does not come into contact with the latch gear 38. Thereafter, when the protrusion 70 of the friction plate 48 comes into contact with the stopper 66, the rotation of the friction plate 48 is stopped again to make slip with the gear wheel 22. In this condition, the wind-out operation holding portion 60 urges up the pawl 42, with the result that the pawl 46 does not come into contact with the latch gear 38 so that the latch gear 38 can freely rotate in the wind-out direction of the seatbelt.

As described above, the webbing is drawn out and the seatbelt is worn with the tongue plate being inserted into a buckle not shown. Normally, the seatbelt 16 is wound out to a length slightly longer than the length required for being worn by the occupant, and hence, such a wind-up operation is caused as to correspond to the excessive length described above. In this case, the gear wheel 22 rotates in the direction indicated by the arrow A in FIG. 4, the friction plate 48 rotates in the direction indicated by the arrow A due to the friction forces with the camplate 46 and the gear wheel 22, and the pawl 42 falls into the bottom 64 of the friction plate 48. Consequently, the pawl 42 meshes with the latch gear 38 of the latch gear wheel 24 as shown in FIG. 5. Namely, the rotation of the latch gear in the direction indicated by the arrow A (in the wind-up direction of the seatbelt) is restricted, whereby the first spring 32 whose internal end is connected to the latch gear wheel 24 falls into a locked condition, so that only the biasing force of the second spring 36 is applied to the take-up shaft 14.

By this, the biasing force applied to the seatbelt 16 is reduced, thereby improving the fitness of the seatbelt for the occupant.

Figure 6:
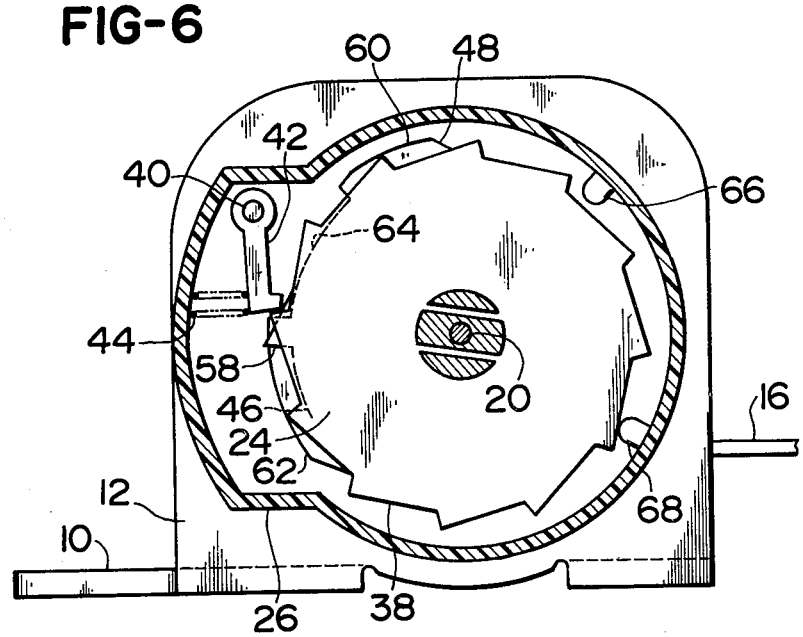

This is the condition where the seatbelt is worn by the occupant, and this condition includes in the range thereof the behavior of the occupant in the car cabin such as the wind-out and wind-up operations of the seatbelt required for operating a cigar lighter, a car radio and the like. Next, description will be given of the case of housing the seatbelt 16 into the wind-up device. If assumption is made that FIG. 5 is the condition where the seatbelt is worn by the occupant, then the ridge 54 of the cam plate is positioned in the upper portion of FIG. 5. When the wind-up of the seatbelt 16 by means of the second spring 36 is begun from this condition, due to the meshing of the one-way clutch, the ridge 54 rotates integrally with the take-up shaft 14 in the direction indicated by the arrow A, reaches the position shown in FIG. 6 where it comes into contact with the tooth top of the pawl 42, and further rotates with the cam surface 56 thereof urging up the tooth top of the pawl 42. In this case, of course, the tooth top of the pawl 42 is meshed with the latch gear 38, and hence, the torque of the first spring 32 acts on the pawl 42 as a load. However, due to the meshing of the one-way clutch, the cam surface 56 can urge up the pawl 42, overcoming said load. Further, when the camplate 46 rotates, the meshing between the tooth top of the pawl and the latch gear 38 is released and the positional relationship shown in FIG. 7 is resulted. By this, the second spring 36 which has been would back is inserted into a position where the torque is balanced at once by means of the first spring 32, whereby the wind-up force acting on the seatbelt 16 comes to be high. In this case, the friction plate 48 rotates along with the camplate 46 in the direction indicated by the arrow A due to the clockwise rotation of the take-up shaft 14, when the camplate 46 has completely urged up the pawl 42, the wind-up operation holding portion 62 maintains the tooth top of the pawl not to mesh with the latch gear 38 as shown in FIG. 7, so that the latch gear 38 can freely rotate in the clockwise direction. Consequently, the rotation of the latch gear 38 accompanied by the subsequent wind-up operation of the seatbelt is not restricted, so that the seatbelt wind-up force acting on the seatbelt 16 can house the seatbelt at a high level of force.

Next, description will given of a special case where the occupant, after putting on the seatbelt, makes a big behavior exceeding one turn of the take-up shaft 14, such as the driver handles a door regulator handle of the assistant driver's seat. The ridge 54 of the camplate 54 rotates from the condition where the seatbelt is worn in FIG. 5 in the direction opposite to that indicated by the arrow A, and the rotation thereof is stopped at the position shown in FIG. 3. If a wind-up operation exceeding said one turn from the positional relationship shown in FIG. 3, then, similarly to the aforesaid seatbelt housing operation, due to the operation of the one-way clutch, the cam surface 56 of the camplate shown in FIG. 7 falls into a condition where the locking of the latch gear 38 is released, whereby the wind-up force of the seatbelt reaches to a high level despite of the fact that the seatbelt is worn. However, if, thereafter, there occurs a seatbelt wind-out operation accompanied by a slight behavior of the occupant, the camplate 46 and the friction plate 48, from the positional relationship shown in FIG. 7, rotate in the counterclockwise direction, reaches the positional relationship shown in FIG. 3, and, through the subsequent wind-up operation, the meshing relationship between the latch gear 38 and the pawl 42 as shown in FIG. 5 is established.

Accordingly, the wind-up force acting on the seatbelt 16 falls to a low level of force, thereby enabling to reduce the feeling of being restrained for the occupant.

Description will hereunder be given of the operation as described above with reference to the characteristic diagram shown in FIG. 10. With the seatbelt retractor according to the present invention, at the time of the wind-up operation within the scope of one turn of the take-up shaft 14 after the seatbelt wind-out operation at a desired position, the wind-up force is changed to a low level, whereby the feeling of being restrained for the occupant when he wears the seatbelt on is reduced and the wind-up force after said one turn is changed to a high level, so that the performance of housing the wind-up device of the seatbelt can be improved. In addition, in FIG. 10, designated at P is the tension of the seatbelt, P1 the seatbelt housing position, P2 a desired seatbelt wind-up starting position, W the seatbelt tension reducing range, i.e. the range of length wherein the occupant wears the seatbelt on, and L a wind-out length of the seatbelt.

In addition, in the embodiment described above, as the means of arranging a one-way clutch in a space formed between the camplate 46 and the gear wheel 22, there adopted the gear wheel 22 integrally formed with the latch 52 and the camplate 46 also integrally formed with the arm 50. However, if the integral formation of the arm 50 is difficult, a spring member separately provided can be attached to the camplate 46. Furthermore, in the present embodiment, the friction plate 48 is provided thereon with the wind-out operation holding portion 60, whereby the pawl 42 is held not to mesh with the latch gear 38 at the time of wind-out operation of the seatbelt. However, this can be abandoned and, instead, a holding portion is added to the ridge 54 of the camplate 46, so that the pawl 42 can be held by means of the camplate 46.

As has been described so far, according to the present invention, the first and second spring which are different in torque value from each other are connected in series to each other and the pawl is engaged with the latch gear provided at the connecting portion between said first and second springs, whereby the biasing force of the first spring is prevented from acting on the take-up shaft. Consequently, the wind-up force when the occupant wears the seatbelt is reduced, whereby the restraining force acting on the occupant is decreased. As the frictionally contacting means for rotating the friction plate which engaged the latch with th pawl when necessary, a pair of projecting resilient members oscillatingly movable are provided on the friction plate, such excellent advantages are attained that, even when the rotational direction of the take-up shaft is different, an identical frictional force can be given to the friction plate and the operations at various components can be reliably performed.

What is claimed is:

1. A seatbelt retractor characterized in that: said retractor comprising: spring means comprising a first spring and a second spring weaker in biasing force than the first spring connected in series by a connecting portion to each other and further connected to a seatbelt take-up shaft so as to render the force for winding up the seatbelt; ratchet means comprising a pawl and at least one latch gear provided at the connecting portion between the first and second springs, said pawl for engaging with said latch gear so as to prevent the biasing force of the first spring from acting on the take-up shaft; a friction plate comprising a frictionally contacting means whereby the turning force of said take-up shaft is imparted thereto by said frictionally contacting means so as to engage said latch gear with the pawl; a one way clutch coupled to said take-up shaft; and cam plate means coupled to saod oneway clutch for releasing the engagement of said latch gear with the pawl by the turning force of the take-up shaft at a predetermined position; said frictionally contacting means comprising a pair of projecting resilient members oscillatingly movable relative to the friction plate and capable of rendering the same frictional force to the frictional plate even in the case the rotational direction of the take-up shaft is altered.

2. A seatbelt retractor as set forth in claim 1, wherein said frictionally contacting means further includes a base portion installed on the frictional plate and said pair of projecting resilient members are integrally formed on the base portion.

3. A seatbelt retractor as set forth in claim 2, characterized in that said base portion is formed into a letter 'U' shape for clamping the friction plate in a width wise direction of the wall thickness base portion.

4. A seatbelt retractor as set forth in claim 3, characterized in that said base portion is provided with shaved-up portions which are engaged with grooves formed in the friction plate so as to prevent the resilient members from falling off.

5. A seatbelt retractor as set forth in claim 4, characterized in that said grooves are formed into letter 'U' shaped opening radially of the friction plate.

6. A seatbelt retractor as set forth in claim 2, characterized in that a bottom face of said base portion formed into a letter 'U' shape comes in linear contact with the forward end portion of a triangular ridge formed on the friction plate and is oscillatingly movable about said forward end portion.

7. a seatbelt retractor as set forth in claim 2, characterized in that said pair of resilient members are spread outwardly in a manner that the respective longitudinal axes cross at an obtuse angle.

8. A seatbelt retractor as set forth in claim 7, wherein said pair of resilient members are each further provided at the forward end portion with a substantially semicircular arcuate portion and further comprising a gear wheel coupled to said take-up shaft, said semicircular arcuate portions coming in contact with the outer peripheral surface of said gear wheel to thereby bring the frictional play into frictional contact with the seatbelt take-up shaft through said gear wheel.

9. A seatbelt retractor as set forth in claim 2, characterized in that said base portion is installed on a protrusion for regulating the angle of rotation which is provided on the friction plate.

* * * * *